US011432292B2

(12) United States Patent
Yang (10) Patent No.: US 11,432,292 B2
(45) Date of Patent: Aug. 30, 2022

(54) RESOURCE ALLOCATION METHOD, AND NETWORK DEVICE, TERMINAL DEVICE AND COMPUTER STORAGE MEDIUM (71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 41 days.

(21) Appl. No.: 16/926,642

(22) Filed: Jul. 10, 2020

(65) Prior Publication Data

US 2020/0344744 A1 Oct. 29, 2020

Related U.S. Application Data (63) Continuation of application No. PCT/CN2018/072462, filed on Jan. 12, 2018.

(51) Int. Cl.
*H04W 72/04* (2009.01)
*H04W 72/12* (2009.01)

(52) U.S. Cl.
CPC .................. *H04W 72/048* (2013.01)

(58) Field of Classification Search
None
See application file for complete search history.

(56) References Cited

U.S. PATENT DOCUMENTS

| 8,694,015 | B2* | 4/2014 | Hsiao | H04W 72/082 455/452.1 |
| 9,629,022 | B2* | 4/2017 | Kazmi | H04W 76/14 |
| 10,897,784 | B2* | 1/2021 | Muraoka | H04W 76/14 |
| 2010/0081444 | A1* | 4/2010 | Jin | H04W 76/32 455/450 |
| 2014/0066084 | A1* | 3/2014 | Paladugu | H04W 72/087 455/452.2 |

(Continued)

FOREIGN PATENT DOCUMENTS

| CN | 102333315 | 1/2012 |
| CN | 103841649 | 6/2014 |

(Continued)

OTHER PUBLICATIONS

Huawei et al., "Discussion on sidelink resource allocation and configuration," 3GPP TSG RAN WG1 Meeting #90, R1-1712135, Aug. 2017, 6 pages.

(Continued)

*Primary Examiner* — Hong S Cho
(74) *Attorney, Agent, or Firm* — Hodgson Russ LLP (57) ABSTRACT

Disclosed are a resource allocation method, a network device, a terminal device, and a computer storage medium. The method includes: receiving reporting information sent by at least one terminal device of a group of terminal devices, wherein the reporting information comprises at least one piece of the following information: characteristics of a service, the number of the group of terminal devices, and the number of resources; and configuring, according to the reporting information, a corresponding bypass resource for at least one terminal device of the group of terminal devices.

5 Claims, 4 Drawing Sheets (56) References Cited

U.S. PATENT DOCUMENTS

2016/0050671 A1\* 2/2016 Yu .................. H04W 72/04
455/450

FOREIGN PATENT DOCUMENTS

| CN | 105530712 | 4/2016 |
|----|-----------|--------|
| CN | 105578382 | 5/2016 |
| CN | 107040557 | 8/2017 |
| WO | 2014187336 | 11/2014 |

OTHER PUBLICATIONS

EPO, Extended European Search Report for EP Application No. 18899392.7, dated Dec. 1, 2020.
WIPO, ISR for PCT/CN2018/072462, Oct. 8, 2018.

\* cited by examiner

RESOURCE ALLOCATION METHOD, AND NETWORK DEVICE, TERMINAL DEVICE AND COMPUTER STORAGE MEDIUM

CROSS-REFERENCE TO RELATED APPLICATIONS

This application is a continuation of International Application No. PCT/CN2018/072462, filed Jan. 12, 2018, the entire disclosure of which is incorporated herein by reference.

TECHNICAL FIELD

The present disclosure relates to the field of information processing technology, and in particular, to a resource allocation method, a network device, a terminal device, and a computer storage media.

BACKGROUND

With the development of service, demand for service switching between local terminals is increasing, and corresponding applications are gradually increasing. For example, due to data sharing caused by local interactive games and local conferences, the local terminals may directly share data with each other to complete the games.

In existing wireless network, the wireless side may not perceive a user's service requirements and the number of users, but dynamically adjusts the resource allocation situation through a QCI method and quality monitoring for the wireless side link.

SUMMARY

Embodiments of the present disclosure provide a resource allocation method, a network device, a terminal device, and a computer storage media.

A resource allocation method provided by an embodiment of the present disclosure is applied to a network device, and includes:

receiving reporting information sent by at least one terminal device of a group of terminal devices; wherein the reporting information includes at least one piece of following information: characteristics of a service, a number of the group of terminal devices, and a number of resources;

configuring, according to the reporting information, a corresponding bypass resource for at least one terminal device of the group of terminal devices.

A resource allocation method provided by an embodiment of the present disclosure is applied to a terminal device, and includes:

sending reporting information to a network side; wherein, the reporting information includes at least one piece of following information: characteristics of a service, a number of terminal devices, and a number of resources;

receiving, a corresponding bypass resource configured for the terminal device by the receiving network side.

A network device provided by an embodiment of the present disclosure, includes:

a first communication unit, for receiving reporting information sent by at least one terminal device of a group of terminal devices; wherein the reporting information includes at least one piece of following information: characteristics of a service, a number of the group of terminal devices, and a number of resources;

a first processing unit, for configuring, according to the reporting information, a corresponding bypass resource for at least one terminal device of the group of terminal devices.

A terminal device provided by an embodiment of the present disclosure, includes:

a second communication unit, for sending reporting information to a network side; wherein, the reporting information includes at least one piece of following information: characteristics of a service, a number of terminal devices, and a number of resources; and for receiving, a corresponding bypass resource configured for the terminal device by the receiving network side.

A network device provided by an embodiment of the present disclosure includes: a processor and a memory for storing a computer program executable on the processor, wherein, in a case where the processor is configured to execute the computer program, the steps of the foregoing method are executed.

A terminal device provided by an embodiment of the present disclosure includes: a processor and a memory for storing a computer program executable on the processor, wherein, in a case where the processor is configured to execute the computer program, the steps of the foregoing method are executed.

An embodiment of the present disclosure provides a computer storage medium that stores computer-executable instructions. In a case where the computer-executable instructions are executed, the foregoing method steps are implemented.

The technical solution of the embodiment of the present disclosure, according to reporting information of a group of terminal devices, may specifically include any one of the information of characteristics of a service, the number of a group of terminal devices, and the number of resources to configure a bypass resource of the terminal devices. In this way, it is possible to optimize a resource allocation adjustment strategy in the transmission of local direct-connected data services in the future, thereby enabling the network to flexibly support local direct-connected data transmission.

DETAILED DESCRIPTION

In order to understand the features and technical contents of the embodiments of the present disclosure in more detail, the implementation of the embodiments of the present disclosure will be described in detail below with reference to the accompanying drawings. The accompanying drawings are for reference only and are not intended to limit the embodiments of the present disclosure.

Embodiment 1

Figure 1:
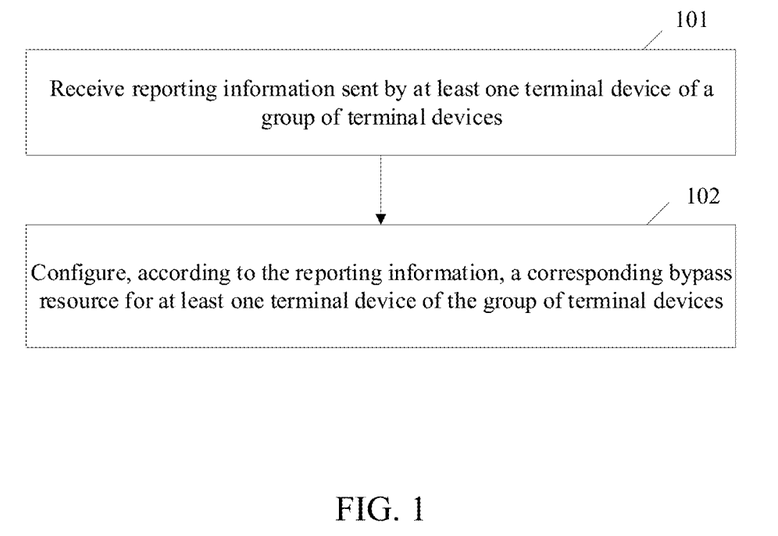
FIG. 1 is a schematic flowchart 1 of a resource allocation method according to an embodiment of the present disclosure.

An embodiment of the present disclosure provides a resource allocation method, which is applied to a network device, as shown in FIG. 1, including:

Step 101: receiving reporting information sent by at least one terminal device of a group of terminal devices, wherein the reporting information comprises at least one piece of following information: characteristics of a service, the number of the group of terminal devices, and the number of resources; and Step 102: configuring, according to the reporting information, a corresponding bypass resource for at least one terminal device of the group of terminal devices.

Here, the network device may be a device on a network side, specifically, a device in a core network on the network side, or a base station on the network side. The terminal device may be a terminal device configured for local direct-connected data service transmission. In addition, the terminal device may be a cluster head terminal or all terminals in the group of terminal devices.

The characteristics of the service are the characteristics of the service that the terminal needs to send or support; the number of resources is the number of resources that the terminal sends related services.

The bypass resource may be understood as a resource for side link between the terminal devices.

The following takes a network device as a device in different locations as an example to describe specific processing scenarios.

Processing scenario 1. A network device is a device in a core network:

receive reporting information sent by at least one terminal device of a group of terminal devices through a non-access stratum (NAS);

wherein, the reporting information further includes: indication information; and the indication information is used to identify that this reporting is a resource to be used for a first application or a re-application for the group of terminal devices. The indication information may be understood as an identification value. For example, when the indication information is 1, it represents that this reporting is a resource to be used for the re-application for the terminal device; and when the indication information is 0, it represents that this reporting is not the resource to be used for re-application for the terminal device.

Further, the configuring, according to the reporting information, the corresponding bypass resource for the at least one terminal device of the group of terminal devices includes:

determining, according to the reporting information, a 5QI or QCI for the group of terminal devices; and sending the 5QI or QCI to a base station; wherein, the base station configures the corresponding bypass resource for the group of terminal devices according to the 5QI or QCI.

It should be noted that, the determining, according to the reporting information, a 5QI or QCI for the group of terminal devices, may be: determining, according to the 5QI or QCI for the group of terminal devices based on characteristics of a service in the reporting information and/or the number of terminal devices.

More specifically, when the characteristics of the service is a low delay service, QCI=1 may be selected based on the characteristics of the service. Further, it may be understood that when the characteristics of the service clearly indicates that an allowable delay time is 100 ms, the QCI=1 may be selected based on the characteristics.

Further, the network device in the core network causes the base station to configure the corresponding bypass resource for the group of terminal devices according to the 5QI or QCI. Specifically, according to the 5QI or QCI, at least one resource may be selected to form a resource pool, and resources in the resource pool may be selected by the terminal device; or, according to the 5QI or QCI, the corresponding bypass resource may be configured for each of at least some terminal devices of the group of terminal devices, so that each of the at least some terminal devices obtains the bypass resource corresponding to itself according to the configuration.

Figure 2:
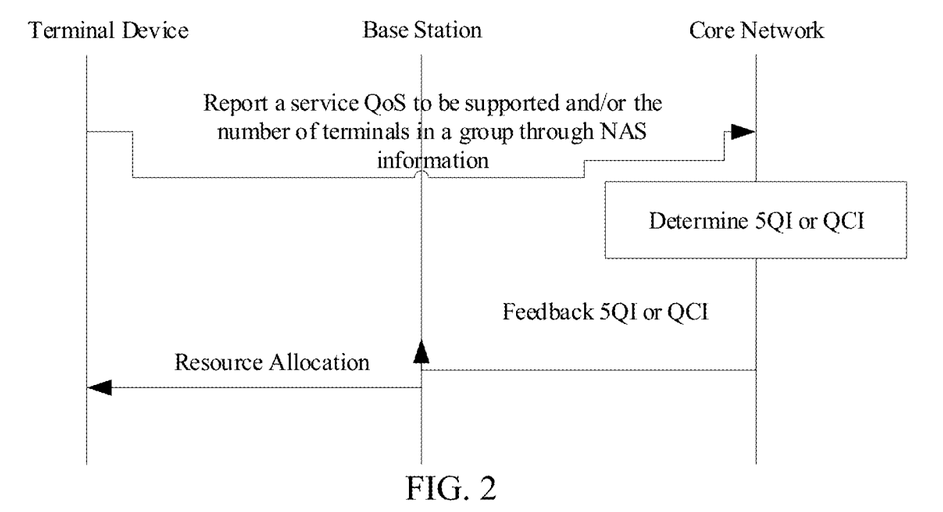
FIG. 2 is a schematic flowchart 2 of a resource allocation method according to an embodiment of the present disclosure.

This processing scenario, combined with FIG. 2, may be specifically understood as: one or more terminals in a group of terminals report QoS and/or a latest number of users of services that need to be supported through a NAS;

a reporting terminal may be a cluster head terminal or all terminals in the group of terminals, but the reporting information should carry information (such as group ID) to identify that the reporting is for re-application for resources used by the group of terminals;

the core network (MME/AMF) determines the 5QI (in NR) or QCI (in LTE) based on the latest number of users and/or the QoS of services that need to be supported.

The latest number of terminal devices may be provided by the terminal, or may be provided by the base station or the core network itself.

The core network delivers a corresponding 5QI or QCI to the base station; accordingly, the base station configures corresponding bypass SL resources for the group of terminals according to the corresponding 5QI or QCI.

Processing scenario 2. It differs from processing scenario 1 in that reporting information does not include the number of the group of terminal devices, specifically:

determining, according to the reporting information, the number of the group of terminal devices;

sending the number of the group of terminal devices to a base station, wherein the number of the group of terminal devices is used to cause the base station to configure, according to the number of terminal devices, a corresponding bypass resource for at least one terminal device of the group of terminal devices.

That is, in this sub-scene, the reporting information may not include the number of the group of terminal devices; the reporting information may include a group identifier corresponding to the group of terminal devices; then the network device may obtain, according to the group identifier in the reporting information, latest quantity information of the group of terminal devices;

correspondingly, the network device on the core network side may not configure a bypass resource, but send the information to the base station, so that the base station completes configuring the bypass resource based on its control.

Processing scenario 3. This scenario is based on the above scenarios 1 and 2. The number of the group of terminal devices and a 5QI or QCI determined by itself may be sent to a base station, so that the base station configures a bypass resource according to the obtained information, specifically: determining, according to the reporting information, the number of the group of terminal devices, and/or determining the 5QI or QCI for the group of terminal devices;

sending the number of the group of terminal devices and/or the 5QI or QCI for the group of terminal devices to a base station, wherein the base station configures, according to the number of terminal devices and/or the 5QI or QCI, the corresponding bypass resource for the at least one terminal device of the group of terminal devices.

It may be understood that how to configure the bypass resource according to the 5QI and QCI in this processing scenario is same as that in processing scenario 1, and will not be described in detail.

Processing scenario 4.

This processing scenario is different from the above processing scenarios 1, 2, and 3, in that a network device in this scenario may be a base station on a network side, and the specific description is as follows:

receiving reporting information sent by at least one terminal device of a group of terminal devices through an access stratum (AS).

A particular sending method may be: receiving the reporting information sent by the terminal device through a MAC CE or through a radio resource control (RRC) message, wherein, the reporting information further includes: indication information; and the indication information is used to identify that this reporting is a resource to be used for a first application or a re-application for the group of terminal devices.

The configuring, according to the reporting information, the corresponding bypass resource for the at least one terminal device of the group of terminal devices, includes:

configuring, according to the number of resources in the reporting information and/or the number of the group of terminal devices, the corresponding bypass resource.

That is, directly configuring, according to the number of resources in the reporting information, the bypass resource for the group of terminal devices; and/or, determining, according to the number of the group of terminal devices, a resource pool of the bypass resource to be configured for the group of terminal devices.

A particular configuration method may be: configuring, according to the number of resources, the resource pool including the bypass resource for the group of terminal devices, or directly configuring, according to the number of resources, a corresponding bypass resource for the terminal devices of the group of terminal devices that need to transmit information, respectively.

Correspondingly, the configuring, according to the number of the group of terminal devices, the bypass resource, may also be that when the number of terminal devices increases, the configured bypass resource increases. For example, by adding the bypass resource in the resource pool, the increased amount may match the increased number of terminal devices. A particular matching method may configure a corresponding bypass resource for each added terminal device. Of course, it is also possible to configure, according to the total number of terminal devices, the bypass resource corresponding to the total number in the resource pool, and then selecting, by the terminal device, the corresponding bypass resource by itself.

The method further includes:

sending the reporting information to a core network and receiving feedback information from the core network;

wherein, the feedback information includes: whether to support access of the number of the terminal devices requested in the reporting information, and/or whether to support a service type or characteristic requested in the reporting information.

For example, it may include that: if the feedback information indicates that the number of terminal devices requested in the reporting information is supported, the base station may continue to configure the resources for the terminal devices; conversely, if the feedback information indicates that the number of terminal devices requested in the reporting information is not supported, the base station may not continue to configure the resources for the terminal devices.

In addition, it may also include that: if the feedback information indicates that the requested service characteristic or type is not supported, the base station (that is, the network device) may not configure the resources for the group of terminal devices; conversely, the base station may continue to configure the resources for the group of terminal devices according to at least one of the number of the group of terminal devices, the number of required resources, and characteristics of a service in the reporting information.

Figure 3:
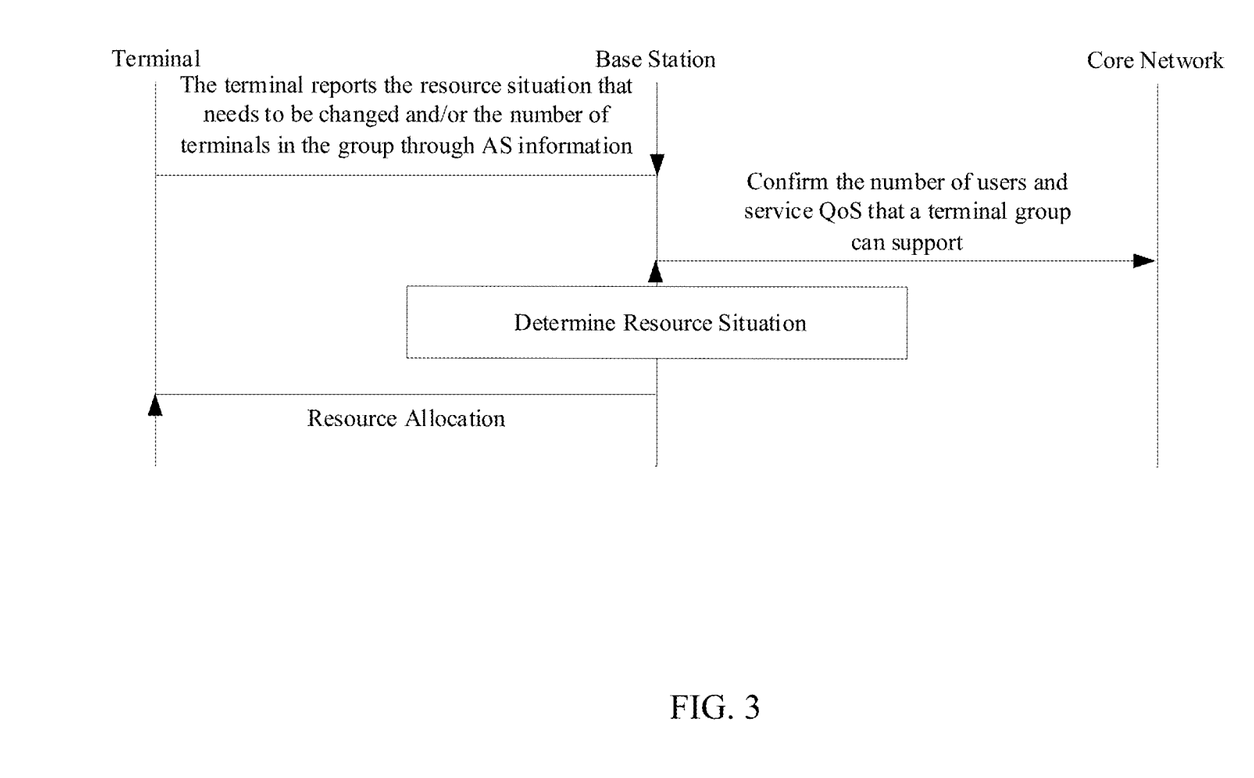
FIG. 3 is a schematic flowchart 3 of a resource allocation method according to an embodiment of the present disclosure.

Specifically, with reference to FIG. 3, it includes that: one or more terminals of a group of terminals report the number of resources and/or the number of latest users through an AS; a reporting terminal may be a cluster head terminal or all terminals in the group of terminals, but the reporting information should carry information (such as group ID) to identify that the reporting is for re-application for resources used by the group of terminals.

Reporting of an AS message may use a MAC CE at a MAC layer or an RRC message, such as: SL UE Information; the messages is added with the latest number of terminals in the group and/or the number of resources that need to be changed.

The reporting of the AS message further includes the characteristics of the service that wish to support, QoS (for example, 5QI or QCI);

after receiving a corresponding message, the base station configures a corresponding SL resource according to updated resource quantity and/or latest user quantity.

In addition, the base station may also forward the request to the core network to confirm whether the group of terminals may support the corresponding number of terminal accesses and services that support corresponding QoS requirements.

It can be seen that, by adopting the above solution, it is possible to configure, according to the reporting information of a group of terminal devices, a bypass resource for the terminal devices, the reporting information specifically including at least one piece of the following information: characteristics of a service, the number of the group of terminal devices, and the number of resources. In this way, it can optimize a resource allocation adjustment strategy in the future local direct-connected data service transmission, and support the addition, modification, and release of resources according to the number of users and service needs, thereby enabling the network to flexibly support local direct-connected data transmission.

Embodiment 2

Figure 4:
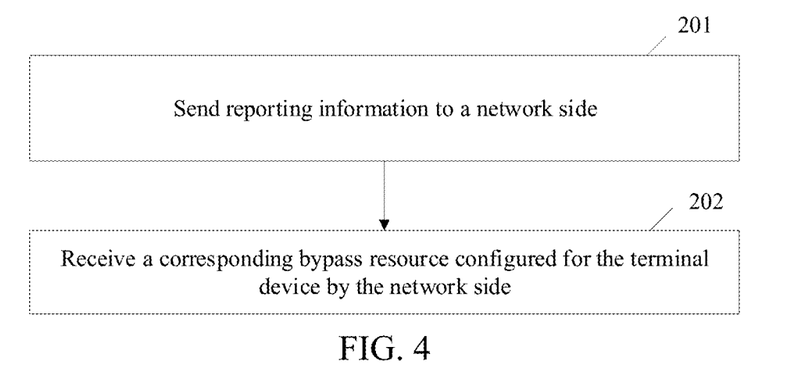
FIG. 4 is a schematic flowchart 4 of a resource allocation method according to an embodiment of the present disclosure.

An embodiment of the present disclosure provides a resource allocation method, which is applied to a terminal device. As shown in FIG. 4, the method includes:

Step 201: sending reporting information to a network side; wherein, the reporting information includes at least one piece of following information: characteristics of a service, the number of a group of terminal devices, and the number of resources;

Step 202: receiving a corresponding bypass resource configured for the terminal device by the network side.

The characteristics of the service are characteristics of the service that the terminal needs to send or support; the number of resources is the number of resources that the terminal sends related services.

Further, after Step 202, it may further include that:

performing selection of the bypass resource to be used by itself, according to the corresponding bypass resource configured for the group of terminal devices where the terminal device is located, by the network side.

Here, the network device may be a device on the network side, specifically, a device in a core network on the network side, or a base station on the network side. The terminal device may be a terminal device configured for local direct-connected data service transmission. In addition, the terminal device may be a cluster head terminal or all terminals in the group of terminal devices.

The bypass resource may be understood as a resource for side link between the terminal devices.

The following takes the network device as a device in different locations as an example to describe different processing methods:

Processing method 1, the network device is a device in a core network:

in this scenario, the sending the reporting information to the network side includes: sending the reporting information to the network side through a non-access stratum (NAS);

wherein, the reporting information further includes: indication information; the indication information is used to identify that this reporting is a resource to be used for a first application or a re-application for the group of terminal devices. The indication information may be understood as an identification value. For example, when the indication information is 1, it represents that this reporting is a resource to be used for the re-application for the terminal device; when the indication information is 0, it represents that this reporting is not the resource to be used for re-application for the terminal device.

Processing method 2, it differs from the above process in that, in this scenario, the network device may be a base station on the network side, which is specifically described as follows:

sending reporting information to the network side through an access stratum (AS).

A particular sending method may be: sending the reporting information through a MAC CE or through a radio resource control (RRC) message.

The reporting information further includes: indication information; and the indication information is used to identify that this reporting is a resource to be used for a first application or a re-application for the group of terminal devices.

The configuring, according to the reporting information, the corresponding bypass resource for the at least one terminal device of the group of terminal devices, includes:

configuring, according to the number of resources in the reporting information and/or the number of the group of terminal devices, the corresponding bypass resource.

That is, directly configuring, according to the number of resources in the reporting information, the bypass resource for the group of terminal devices; and/or, determining, according to the number of the group of terminal devices, a resource pool of the bypass resource to be configured for the group of terminal devices.

Based on the above solution, there are two methods for the terminal device to finally obtain the bypass resource.

Method 1: receiving the bypass resource allocated to the terminal device by the network side and applied to the terminal device;

that is, the network side directly configures the corresponding bypass resource for at least some terminal devices of the group of terminal devices, respectively, so that the terminal device can directly obtain the bypass resource configured by the network side.

Method 2: receiving a resource pool allocated by the network side to the group of terminal devices where the terminal device is located, and selecting the bypass resource from the resource pool.

That is, the network side can directly allocate a corresponding resource pool to the group of terminal devices, wherein the terminal devices can select the bypass resource from the resource pool.

It can be seen that, by adopting the above solution, it is possible to configure, according to the reporting information of a group of terminal devices, a bypass resource for the terminal devices, the reporting information specifically including at least one piece of the following information: characteristics of a service, the number of the group of terminal devices, and the number of resources. In this way, it can optimize a resource allocation adjustment strategy in the future local direct-connected data service transmission, and support the addition, modification, and release of resources according to the number of users and service needs, thereby enabling the network to flexibly support local direct-connected data transmission.

Embodiment 3

Figure 5:
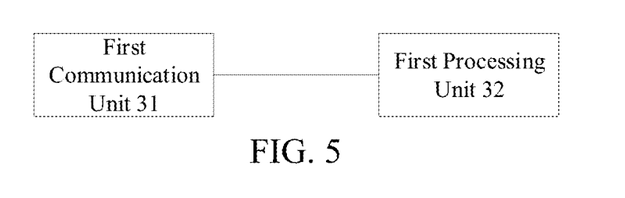
FIG. 5 is a schematic structural diagram of a network device according to an embodiment of the present disclosure.

An embodiment of the present disclosure provides a network device, as shown in FIG. 5, including:

a first communication unit 31, for receiving reporting information sent from at least one terminal device of a group of terminal devices; wherein, the reporting information includes at least one piece of following information: characteristics of a service, the number of the group of terminal devices, and the number of resources;

a first processing unit 32, for configuring, according to the reported information, a corresponding bypass resource for at least one terminal device of the group of terminal devices.

The characteristics of the service are the characteristics of the service that the terminal needs to send or support; the number of resources is the number of resources that the terminal sends related services.

Here, the network device may be a device on a network side, specifically, a device in a core network on the network side, or a base station on the network side. The terminal device may be a terminal device configured for local direct-connected data service transmission. In addition, the terminal device may be a cluster head terminal or all terminals in the group of terminal devices.

The bypass resource may be understood as a resource for side link between the terminal devices.

The following takes a network device as a device in different locations as an example to describe specific processing scenarios.

Processing scenario 1. A network device is a device in a core network:

the first communication unit 31, receives reporting information sent by at least one terminal device of a group of terminal devices through a non-access stratum (NAS);

wherein, the reporting information further includes: indication information; the indication information is used to identify that this reporting is a resource to be used for a first application or a re-application for the group of terminal devices. The indication information may be understood as an identification value. For example, when the indication information is 1, it represents that this reporting is a resource to be used for the re-application for the terminal device; when the indication information is 0, it represents that this reporting is not the resource to be used for re-application for the terminal device.

Further, the first processing unit 32, determines, according to the reporting information, a 5QI or QCI for the group of terminal devices;

The first communication unit 31, sends the 5QI or QCI to a base station; wherein, the base station configures the corresponding bypass resource for the group of terminal devices according to the 5QI or QCI.

It should be noted that, the determining, according to the reporting information, a 5QI or QCI for the group of terminal devices, may be: determining, according to the 5QI or QCI for the group of terminal devices based on characteristics of a service in the reporting information and/or the number of terminal devices.

More specifically, when the characteristics of the service is a low delay service, QCI=1 may be selected based on the characteristics of the service. Further, it may be understood that when the characteristics of the service clearly indicates that an allowable delay time is 100 ms, the QCI=1 may be selected based on the characteristics.

Further, the network device in the core network cause the base station to configure the corresponding bypass resource for the group of terminal devices according to the 5QI or QCI. Specifically, according to the 5QI or QCI, at least one resource may be selected to form a resource pool, and resources in the resource pool may be selected by the terminal device; or, according to the 5QI or QCI, the corresponding bypass resource may be configured for each of at least some terminal devices of the group of terminal devices, so that each of the at least some terminal devices obtains the bypass resource corresponding to itself according to the configuration.

This processing scenario. Combined with FIG. 2, it may be specifically understood as: one or more terminals in a group of terminals report QoS and/or a latest number of users of services that need to be supported through a NAS;

a reporting terminal may be a cluster head terminal or all terminals in the group of terminals, but the reporting information should carry information (such as group ID) to identify that the reporting is for re-application for resources used by the group of terminals;

the core network (MME/AMF) determines the 5QI (in NR) or QCI (in LTE) based on the latest number of users and/or the QoS of services that need to be supported.

The latest number of terminal devices may be provided by the terminal, or may be provided by the base station or the core network itself.

The core network delivers a corresponding 5QI or QCI to the base station; accordingly, the base station configures corresponding bypass SL resources for the group of terminals according to the corresponding 5QI or QCI.

Processing scenario 2. It differs from processing scenario 1 in that reporting information does not include the number of the group of terminal devices, specifically:

the first processing unit 32, determining, according to the reporting information, the number of the group of terminal devices;

the first communication unit 31, sending the number of the group of terminal devices to a base station, wherein the number of the group of terminal devices is used to cause the base station to configure, according to the number of terminal devices, a corresponding bypass resource for at least one terminal device of the group of terminal devices.

That is, in this sub-scene, the reporting information may not include the number of the group of terminal devices; the reporting information may include a group identifier corresponding to the group of terminal devices; then the network device may obtain, according to the group identifier in the reporting information, latest quantity information of the group of terminal devices;

correspondingly, the network device on the core network side may not configure a bypass resource, but send the information to the base station, so that the base station completes configuring the bypass resource based on its control.

Processing scenario 3. This scenario is based on the above scenarios 1 and 2. The number of the group of terminal devices and a 5QI or QCI determined by itself may be sent to a base station, so that the base station configures a bypass resource according to the obtained information, specifically: determining, according to the reporting information, the number of the group of terminal devices, and/or determine the 5QI or QCI for the group of terminal devices;

sending the number of the group of terminal devices and/or the 5QI or QCI for the group of terminal devices to a base station, wherein the base station configures, according to the number of terminal devices and/or the 5QI or QCI, a corresponding bypass resource for at least one terminal device of the group of terminal devices.

It may be understood that how to configure the bypass resource according to the 5QI and QCI in this processing scenario is same as that in processing scenario 1, and will not be described in detail.

Processing scenario 4.

This processing scenario is different from the above processing scenarios 1, 2, and 3, in that a network device in this scenario may be a base station on a network side, and the specific description is as follows:

the first communication unit 31, receives reporting information sent by at least one terminal device of a group of terminal devices through an access stratum (AS).

A particular sending method may be: receiving the reporting information sent by the terminal device through a MAC CE or through a radio resource control (RRC) message;

wherein, the reporting information further includes: indication information; the indication information is used to identify that this reporting is a resource to be used for a first application or a re-application for the group of terminal devices.

The first processing unit 32, configures, according to the number of resources in the reporting information and/or the number of the group of terminal devices, the corresponding bypass resource.

That is, directly configuring, according to the number of resources in the reporting information, the bypass resource for the group of terminal devices; and/or, determining, according to the number of the group of terminal devices, a resource pool of the bypass resource to be configured for the group of terminal devices.

A particular configuration method may be: configuring, according to the number of resources, the resource pool including the bypass resource for the group of terminal devices, or directly configuring, according to the number of resources, a corresponding bypass resource for the terminal devices of the group of terminal devices that need to transmit information, respectively.

Correspondingly, the configuring, according to the number of the group of terminal devices, the bypass resource, may also be that when the number of terminal devices increases, the configured bypass resource increases. For example, by adding the bypass resource in the resource pool, the increased amount may match the increased number of terminal devices. A particular matching method may configure a corresponding bypass resource for each added terminal device. Of course, it is also possible to configure, according to the total number of terminal devices, the bypass resource corresponding to the total number in the resource pool, and then selecting, by the terminal device, the corresponding bypass resource by itself.

The first communication unit 31, sends the reporting information to a core network and receives feedback information from the core network;

wherein, the feedback information includes: whether to support access of the number of the terminal devices requested in the reporting information, and/or whether to support a service type or characteristic requested in the reporting information.

For example, the feedback information may include: if the feedback information indicates that the number of terminal devices requested in the reporting information is supported, the base station may continue to configure the resources for the terminal devices; conversely, if the feedback information indicates that the number of terminal devices requested in the reporting information is not supported, the base station may not continue to configure the resources for the terminal devices.

In addition, the feedback information may also include: if the feedback information indicates that the requested service characteristic or type is not supported, the base station (that is, the network device) may not configure the resources for the group of terminal devices; conversely, the base station may continue to configure the resources for the group of terminal devices according to at least one of the number of the group of terminal devices, the number of required resources, and characteristics of a service in the reporting information.

Specifically, with reference to FIG. 3, the method includes: one or more terminals of a group of terminals report the number of resources and/or the number of latest users through an AS; a reporting terminal may be a cluster head terminal or all terminals in the group of terminals, but the reporting information should carry information (such as group ID) to identify that the reporting is for re-application for resources used by the group of terminals.

Reporting of an AS message may use a MAC CE at a MAC layer or an RRC message, such as: SL UE Information; the messages add the latest number of terminals in the group and/or the number of resources that need to be changed.

The reporting of the AS message further includes the characteristics of the service that wish to support, QoS (for example, 5QI or QCI);

after receiving a corresponding message, the base station configures a corresponding SL resource according to updated resource quantity and/or latest user quantity.

In addition, the base station may also forward the request to the core network to confirm whether the group of terminals may support the corresponding number of terminal accesses and services that support corresponding QoS requirements.

It can be seen that, by adopting the above solution, it is possible to configure, according to the reporting information of a group of terminal devices, a bypass resource for the terminal devices, the reporting information specifically including at least one piece of the following information: characteristics of a service, the number of the group of terminal devices, and the number of resources. In this way, it can optimize a resource allocation adjustment strategy in the future local direct-connected data service transmission, and support the addition, modification, and release of resources according to the number of users and service needs, thereby enabling the network to flexibly support local direct-connected data transmission.

Embodiment 4

Figure 6:
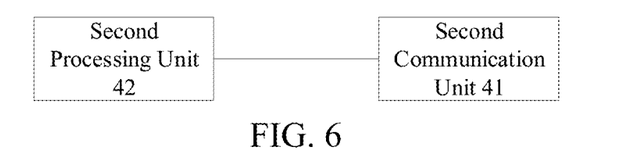
FIG. 6 is a schematic structural diagram of a terminal device according to an embodiment of the present disclosure.

An embodiment of the present disclosure provides a terminal device, as shown in FIG. 6, including:

a second communication unit 41, for sending reporting information to a network side; wherein, the reporting information includes at least one piece of following information: characteristics of a service, the number of a group of terminal devices, and the number of resources; and receiving a corresponding bypass resource configured for the terminal device by the network side;

wherein, the characteristics of the service are characteristics of the service that the terminal needs to send or support; the number of resources is the number of resources that the terminal sends related services.

Here, the network device may be a device on the network side, specifically, a device in a core network on the network side, or a base station on the network side. The terminal device may be a terminal device configured for local direct-connected data service transmission. In addition, the terminal device may be a cluster head terminal or all terminals in the group of terminal devices.

The bypass resource may be understood as a resource for side link between the terminal devices.

The following takes the network device as a device in different locations as an example to describe different processing methods:

Processing method 1, the network device is a device in a core network:

in this scenario, the second communication unit 41, sends the reporting information to the network side through a non-access stratum (NAS).

wherein, the reporting information further includes: indication information; the indication information is used to identify that this reporting is a resource to be used for a first application or a re-application for the group of terminal devices. The indication information may be understood as an identification value. For example, when the indication information is 1, it represents that this reporting is a resource to be used for the re-application for the terminal device; when the indication information is 0, it represents that this reporting is not the resource to be used for re-application for the terminal device.

Processing method 2,

It differs from the above process in that, in this scenario, the network device may be a base station on the network side, which is specifically described as follows:

the second communication unit 41, sends the reporting information to the network side through an access stratum (AS).

A particular sending method may be: sending the reporting information through a MAC CE or through a radio resource control (RRC) message.

The reporting information further includes: indication information; the indication information is used to identify that this reporting is a resource to be used for a first application or a re-application for the group of terminal devices.

The configuring, according to the reporting information, the corresponding bypass resource for the at least one terminal device of the group of terminal devices, includes:

configuring, according to the number of resources in the reporting information and/or the number of the group of terminal devices, the corresponding bypass resource.

That is, directly configuring, according to the number of resources in the reporting information, the bypass resource for the group of terminal devices; and/or, determining, according to the number of the group of terminal devices, a resource pool of the bypass resource to be configured for the group of terminal devices.

Based on the above solution, there are two methods for the terminal device to finally obtain the bypass resource.

Method 1: the second communication unit 41, receiving the bypass resource allocated to the terminal device by the network side and applied to the terminal device;

that is, the network side directly configures the corresponding bypass resource for at least some terminal devices of the group of terminal devices, respectively, so that the terminal device can directly obtain the bypass resource configured by the network side.

Method 2: the terminal device further including:

a second processing unit 42, for selecting a bypass resource from the resource pool;

the second communication unit 41, receiving the resource pool allocated by the network side to the group of terminal devices where the terminal device is located.

That is, the network side can directly allocate a corresponding resource pool to the group of terminal devices, wherein the terminal devices can select the bypass resource from the resource pool.

It can be seen that, by adopting the above solution, it is possible to configure, according to the reporting information of a group of terminal devices, a bypass resource for the terminal devices, the reporting information specifically including at least one piece of the following information: characteristics of a service, the number of the group of terminal devices, and the number of resources. In this way, it can optimize a resource allocation adjustment strategy in the future local direct-connected data service transmission, and support the addition, modification, and release of resources according to the number of users and service needs, thereby enabling the network to flexibly support local direct-connected data transmission.

Figure 7:
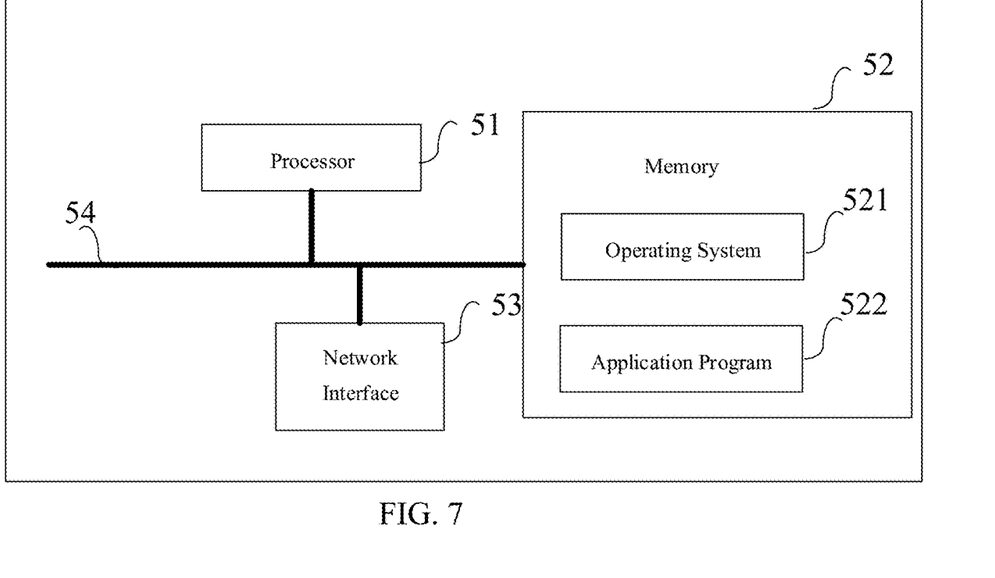
FIG. 7 is a schematic diagram of a hardware architecture according to an embodiment of the present disclosure.

An embodiment of the present disclosure also provides a hardware composition architecture of a network device or a terminal device, as shown in FIG. 7, including: at least one processor 51, a memory 52, and at least one network interface 53. The various components are coupled together via the bus system 54. Understandably, the bus system 54 is used to implement connection and communication between these components. In addition to a data bus, the bus system 54 also includes a power bus, a control bus, and a status signal bus. However, for clarity, various buses are marked as the bus system 54 in FIG. 5.

It may be understood that the memory 52 in the embodiment of the present disclosure may be a volatile memory or a nonvolatile memory, or may include both volatile and nonvolatile memory.

In some embodiments, the memory 52 stores the following elements, executable modules or data structures, or their subsets, or their extensions:

an operating system 521 and an application program 522.

The processor 51 is configured to be able to process the method steps of Embodiment 1 or Embodiment 2, which will not be repeated here.

An embodiment of the present disclosure provides a computer storage medium that stores computer-executable instructions. When the computer-executable instructions are executed, the method steps of the foregoing embodiment one or two are implemented.

If the above device in the embodiment of the present disclosure is implemented in the form of a software function module and sold or used as an independent product, it may also be stored in a computer-readable storage medium. Based on this understanding, the technical solutions of the embodiments of the present disclosure can be embodied in the form of software products in essence or part of contributions to the prior art. The computer software product is stored in a storage medium and includes several instructions for a computer device (which may be a personal computer, a server, or a network device, etc.) executes all or part of the methods described in the embodiments of the present disclosure. The foregoing storage media include various media that can store program codes, such as a U disk, a mobile hard disk, a Read Only Memory (ROM), a magnetic disk, or an optical disk. In this way, the embodiments of the present disclosure are not limited to any specific combination of hardware and software.

Correspondingly, an embodiment of the present disclosure also provides a computer storage medium in which a computer program is stored, and the computer program is configured to execute the data scheduling method of the embodiment of the present disclosure.

Although the preferred embodiments of the present disclosure have been disclosed for illustrative purposes, those skilled in the art will realize that various improvements, additions, and substitutions are also possible, and therefore, the scope of the present disclosure should not be limited to the above-described embodiments.

What is claimed is:

1. A method for resource allocation, applied to a network device, comprising:
    receiving reporting information sent by at least one terminal device of a group of terminal devices; wherein the reporting information comprises a number of terminal devices in the group of terminal devices; and
    configuring, according to the reporting information, a corresponding sidelink resource for at least one terminal device of the group of terminal devices;
    wherein the receiving the reporting information sent by the at least one terminal device of the group of terminal devices comprises receiving the reporting information sent by the terminal device through a MAC CE or through a radio resource control (RRC) message;
    wherein the configuring, according to the reporting information, the corresponding sidelink resource for the at least one terminal device of the group of terminal devices comprises configuring, according to the number of terminal devices in the group of terminal devices, the corresponding sidelink resource;

wherein the method further comprises sending the reporting information to a core network and receiving feedback information from the core network;

wherein the feedback information includes whether to support access of the number of terminal devices requested in the reporting information.

2. The method according to claim 1, wherein the receiving the reporting information sent by the at least one terminal device of the group of terminal devices comprises:

receiving the reporting information sent by the at least one terminal device of the group of terminal devices through a non-access stratum (NAS).

3. The method according to claim 2, wherein the reporting information further comprises: indication information; and the indication information is used to identify that this reporting is a resource to be used for a first application or a re-application for the group of terminal devices.

4. The method according to claim 2, wherein the configuring, according to the reporting information, the corresponding sidelink resource for at least one terminal device of the group of terminal devices comprises:

determining, according to the reporting information, the number of the group of terminal devices, and/or determining the 5QI or QCI for the group of terminal devices; and sending the number of the group of terminal devices and/or the 5QI or QCI for the group of terminal devices to a base station, wherein the base station configures, according to the number of terminal devices and/or the 5QI or QCI, the corresponding sidelink resource for the at least one terminal device of the group of terminal devices.

5. The method according to claim 1, wherein the reporting information further comprises: indication information; and the indication information is used to identify that this reporting is a resource to be used for a first application or a re-application for the group of terminal devices.

\* \* \* \* \*